(12) United States Patent
Sahlberg et al.

(10) Patent No.: US 7,960,011 B2
(45) Date of Patent: Jun. 14, 2011

(54) MARKINGS AND METHOD OF PRODUCING THE SAME

(75) Inventors: Teppo Sahlberg, Lappeenranta (FI); Timo Kallio, Tampere (FI); Tuomas Mustonen, Jyväskylä (FI)

(73) Assignee: M-real Oyj, Espoo (FI)

( * ) Notice: Subject to any disclaimer, the term of this patent is extended or adjusted under 35 U.S.C. 154(b) by 690 days.

(21) Appl. No.: 11/885,879

(22) PCT Filed: Mar. 8, 2006

(86) PCT No.: PCT/FI2006/000081
§ 371 (c)(1),
(2), (4) Date: Nov. 9, 2007

(87) PCT Pub. No.: WO2006/095049
PCT Pub. Date: Sep. 14, 2006

(65) Prior Publication Data
US 2008/0145620 A1    Jun. 19, 2008

(30) Foreign Application Priority Data
Mar. 9, 2005 (FI) ...................... 20050257

(51) Int. Cl.
*B32B 3/28* (2006.01)
*B32B 3/00* (2006.01)
*B32B 3/30* (2006.01)
*B32B 7/14* (2006.01)
*B32B 5/16* (2006.01)
*B41M 3/10* (2006.01)
*B44C 5/04* (2006.01)
*G03G 7/00* (2006.01)

(52) U.S. Cl. ..... 428/172; 428/156; 428/167; 428/195.1; 428/211.1; 428/203; 428/204

(58) Field of Classification Search ............... 428/141, 428/142, 147, 153, 156, 167, 172, 195.1, 428/211.1, 203, 204; 359/2, 558, 569, 576; 283/91
See application file for complete search history.

(56) References Cited

U.S. PATENT DOCUMENTS

| | | | |
|---|---|---|---|
| 5,164,227 A | 11/1992 | Miekka et al. | 427/162 |
| 5,318,807 A * | 6/1994 | Gili Picoy | 427/510 |
| 5,335,113 A * | 8/1994 | Jackson et al. | 359/569 |
| 6,749,925 B2 | 6/2004 | Hoppe et al. | 428/167 |
| 7,029,757 B1 * | 4/2006 | Levy | 428/458 |
| 2003/0227099 A1 | 12/2003 | Makansi | 264/1.34 |
| 2004/0207892 A1 | 10/2004 | Menz et al. | 359/2 |
| 2004/0218238 A1 | 11/2004 | Xie et al. | 359/3 |
| 2004/0247829 A1 | 12/2004 | Depres | 428/141 |

FOREIGN PATENT DOCUMENTS
EP    0 540 455 A1    5/1993
(Continued)

*Primary Examiner* — David R Sample
*Assistant Examiner* — Catherine Simone
(74) *Attorney, Agent, or Firm* — Kubovcik & Kubovcik (57) ABSTRACT

The invention relates to a method for producing a visually identifiable diffractive pattern on a substrate by subjecting the substrate to pressure by bringing it into contact with a surface of an embossing plate. An imprinted paper or paperboard sheet, which is varnished at the contacting area of the embossing plate and the substrate is used as a substrate for the embossing. The invention relates also to a product manufactured using the described method. The method is applicable, for example, for common packaging materials, which contain a paperboard, imprinting and a varnish layer for producing a visually attractive and unique marking.

13 Claims, 5 Drawing Sheets

FOREIGN PATENT DOCUMENTS

| | | |
|---|---|---|
| EP | 1 093 932 A1 | 4/2001 |
| WO | WO 02097538 A1 * | 12/2002 |
| WO | 03/002330 A1 | 1/2003 |
| WO | WO 03002816 A2 * | 1/2003 |
| WO | 2006/037851 A1 | 4/2006 |

* cited by examiner

MARKINGS AND METHOD OF PRODUCING THE SAME

This application is a 371 of international application PCT/FI2006/000081 filed Mar. 8, 2006, which claims priority based on Finnish patent application No. 20050257 filed Mar. 9, 2005, which is incorporated herein by reference.

BACKGROUND OF THE INVENTION

1. Field of the Invention

The present invention relates to marking of products. In particular, the present invention concerns visually detectable markings on paper and paperboard sheets and methods of producing such products.

2. Description of Related Art

Security markings are commonly incorporated into products to indicate their authenticity or origin. Usually, the markings are applied to the packages of the products. The marking can be visible to the naked eye or its detection may require special instrumentation. An example of a traditional visible security marking is the watermark, which comprises an impression pattern made on the surface of paper. Envelopes and packages are provided with seals and tabs to ensure the integrity of the product. Banknotes are often provided with hologram patterns, holographic security threads and similar marks to complicate counterfeiting of the products. These security markings have also been integrated into product packages, such as casings of computer programs, electronic devices and valuables.

Recently, increased attention has been focused on security markings comprising of diffractive and holographic patterns. The appearance of holograms is visually impressive and the reproduction of a hologram is difficult in the sense that it requires special equipment.

Traditionally, markings of the above kind have been attached to packages as separate labels. Thus, holograms have been manufactured using hot embossing techniques on separate plastic-based films or labels, which are laminated or pasted onto the package. Recently, the level of security provided by hologram labels has been impaired by the high number of counterfeit products and holographic labels produced in Asia.

To further complicate the counterfeiting of the marking and of the packaging blank, it has been suggested in the art to incorporate holograms directly onto the surface of the packaging material. In such embodiments, holographic patterns are embossed onto a special holographic receiving layer on the surface of material using embossing rolls. Problems related to embossing of fibre-based products include, for example, sticking of the embossing tool to the surface of the product, clogging of the embossing tool, visually low reflection level, expensive embossing equipment or coating materials of the product, stringent requirements of the embossing conditions, such as embossing temperature and pressure, fading of the holographic element due to smoothening of the holographic layer, numerous pre-processing steps required before embossing, and low productivity of the production lines. In addition, specialized coatings usually require an approval of authorities, such as the Food and Drug Administration (FDA) of the USA or the Bundesinstitut für Risikobewertung (BFR) of Germany, before they can be used in, for example, food or medicine packages. The problems listed are often interrelated, i.e., solving of one may result in aggregation of other.

A number of methods have been developed, which attempt to tackle the above problems. In the following, the art related to embossable holographic markings is shortly reviewed.

WO 03/002330 discloses a method for making holograms onto a paper or plastic film, which has a coating that includes plastic pigment particles to enhance the embossability and printability of the surface. The embossing is applied on the film before it is imprinted.

US 2004/0218238 discloses a method for creating a holographic image on a printed surface by embossing. The printed roll or sheet is coated with a transparent holographic coating. The document suggests the use of a heated rolling panel embosser unit to produce the holograms on roll material. After the roll embossing phase, the base material is cut with a separate die cutter for further use. The document suggests that a special embossing machine is used for embossing the material in sheet form. However, no further teachings concerning such machines are given.

U.S. Pat. No. 5,164,227 discloses a method for decoration of paper or plastic sheets by embossing. The substrate is provided with a thermoplastic material by extrusion or coating. Before embossing, the coating is heated to soften it and to ensure the reproducibility of the pattern of the embossing device onto the sheeting. The primary embossing equipment described in the document comprises an embossing roll, a nip roll and optionally a take-off roll.

US 2003/0227099 discloses another method for creating a rainbow and/or holographic image on a thermoplastic fibrous sheet or polymeric film. In the known method, the diffraction grating is carried out by employing a polymeric film as an embossing shim. The sheet or film to be embossed is heated before embossing/processing.

US 2004/02077892 suggests a method for producing a second hologram to a hot stamping foil, sticker embossing film or paper coated with thermal lacquer and comprising a first hologram. The holographic product can be used as a sticker for attachment to another product. For enhancing the visibility of the hologram, metallization of the surface of the product is suggested.

In US 2004/0247829, proposes embossing a holographic image on a pigment coating layer. Coating layer is preferred, because of its ability to receive the embossing and to bind printing ink.

U.S. Pat. No. 6,749,925 discloses manufacturing macroscopic lens-like structures on a polymeric layer. The lens-like structures exhibit tilt effects, when viewed from different angles.

The prior diffractive security marking and decoration techniques set high requirements either for the surface to be embossed or for the embossing process. No method has been proposed that would be cost-effectively applicable on high-grade product packages as well as on packages of low price daily consumer goods, fast moving consumer goods (FMCG) or food. The application cost of the marking should be relatively small compared to the cost of the product and its package. In addition, the prior embossing techniques necessitate additional processing of the embossed surfaces in order to achieve visually complete and/or mechanically durable decorations.

SUMMARY OF THE INVENTION

It is an aim of the present invention to provide a simplified, cost-effective technique for producing visual markings on substrates.

In particular, it is an aim of the present invention to provide a novel method of producing a visually identifiable pattern on a substrate.

It is another aim of the invention to provide a paper or paperboard sheet comprising a visually identifiable pattern.

These and other objects, together with the advantages thereof over known products and methods, are achieved by the present invention as hereinafter described and claimed.

The basic idea of the invention is to apply a visually identifiable pattern on a varnished sheet by flat-bed embossing. In particular, the invention is directed to diffractive patterns applied on imprinted sheets, which contain a varnish layer applied thereto. We have surprisingly found that conventional lacquers and varnishes, which are widely used in paper and paperboard industry, are embossable with sufficiently high resolution and quality to produce diffractive effects in the wavelengths of visible light. Typically such varnishes are used for improving mechanical, chemical or physical properties, e.g. wear- and moisture-resistance or surface gloss, of the paper or paperboard. In addition, we have discovered that by embossing varnished surfaces, novel glossy markings can be achieved. We have also found that by flat-bed embossing the markings can be produced even without pre-heating of the sheet or the varnish layer. In particular, diffractive patterns formed on a varnish layer applied onto an imprinted substrate, have proven to exhibit a decorative effect of a special kind.

Many advantages can be achieved by means of the invention. The method is applicable to ordinary substrates, which are widely used and well known in the paper industry, such as packaging paperboards. As the embossing is applied on a varnish layer, there is no need for special coatings and pigments, which may be expensive or which may affect the properties of the sheeting disadvantageously. The invention can be carried out with varnishes conventionally used, for example, as finishing layers of packages. Such varnishes have preferable characteristics, such as gloss, hardness, brightness and safety features, and they are approved by the consumers and authorities. Varnishing is also a very economical coating method. Using the present method, an easily identifiable and viewable pattern can be applied on the sheet also without expensive metallization of the surface. As is well known, varnished surfaces are also highly scratch-, wear- and damp-resistant or they are even scratch-, wear- and damp-proof.

The embossed sheets may be used, for example, in the packaging industry to render the product a safety-marking for warranting the authenticity of the product or to graphically enrich the exterior decorative image of the package. Examples of application areas are packing of daily consumer goods, cigarettes, digital media, pharmaceuticals, cosmetics, consumer electronics, fast moving consumer goods (FMCG) and food products.

When the method is applied on surfaces which are imprinted before varnishing, several advantages are achieved. A print, for example on a package, forms the basis for the visual appearance of the package. Varnishing of printed surfaces is a well known method. By embossing varnished products, the problems present in the prior art can be avoided, namely the demanding requirements for the holographic coating or the requirement to carry out the embossing before imprinting of the substrate in a separate step. The fact that the security marking can be applied to the surface during the last or penultimate step of the converting process, before or even during cutting, is highly advantageous from the point of view of a package converter, product packager or brand owner, for example. If an imprinting is applied on a high-resolution embossing, it is almost inevitable that the decorative effect is degraded. If the embossed pattern is further positioned in a certain geometrical relationship with the features of the print, additional improvement of the appearance of the product may be achieved.

According to one embodiment, flat-bed embossing is carried out in the same processing phase as in which the sheet is cut. The product lines, especially the die cutters used, can relatively easily be adapted to carry out the mentioned function. Hence, this embodiment can be effected with minor costs by implementing only slight modifications to existing converting machinery. Compared with the prior art methods, the embossing according to the present invention can be done in a reduced number of processing steps. By avoiding separate and additional process phases, bottle-neck situations can be avoided.

According to one embodiment, the embossing shim, i.e., the embossing plate, comprises both a smooth area and a diffractive pattern. When the plate is pressed against the varnish layer, the diffraction pattern is replicated on selected areas of the sheet and the smooth area increases the gloss of other areas of the sheet. This produces a new kind of visual effect, which improves the appearance of the embossed product and contributes to making the product even more difficult to counterfeit. If the microscale pattern is positioned inside the smooth area, the actual diffractive pattern is high-lighted. By this means it is possible to achieve a marking, which is unique in its appearance compared to known markings.

According to another embodiment, a pneumatic separator is used for separating the embossing plate from the sheet after contacting the plate and the sheet.

By means of the embodiments of the invention, some problems related to the use of roll embossers can be solved. Roll embossers require the marking to be repeating in nature, the period being defined by the circumference of the roller. In addition, fabrication of the embossing rolls is much more expensive than fabrication of the embossing plates and the whole roll has to be changed in order to change the embossing. Therefore, they are not well suited to applications, where either the embossing figure or the size of the embossed sheet is subject to frequent changes. This is often the case, for example, in the packaging industry, especially in factories producing several products, potentially having variable package sizes, and using same packing lines for more than one product.

By properly combining the above-mentioned embodiments, a method can be achieved, which
- secures the authenticity of a product,
- can be applied on ordinary packaging materials,
- reduces the number of processing steps of authenticity-secured packaging processes,
- gives the product a unique outward appearance, and
- is applicable to high and low output product lines and small workshops.

Further advantages of the invention are listed in the following detailed description of the embodiments.

In this document, the invention and its embodiments are discussed mainly with reference to package material manufacturing, package converting and product packaging. However, a person skilled in the art understands that the embodiments are applicable also to many other purposes, such as for the production of magazines, postcards, envelopes, calling cards, business cards, brochures, data sheets, records, certificates and diplomas. In principle, all varnish-coated embossable paper and paperboard objects can be subjected to the method.

The term "paperboard" is used in a broad sense, comprising also boards that could be characterized by the words "cardboard", "cartonboard", "board" and even "fibre board" and "pasteboard".

BRIEF DESCRIPTION OF THE DRAWINGS

In the following description, the invention is described more closely with the aid of the attached drawings, wherein.

DETAILED DESCRIPTION OF THE INVENTION

As discussed above, the present invention provides a novel kind of fibrous sheet or web, typically a paper or paperboard sheet, comprising: a base layer having two opposite surfaces, and at least one layer of material arranged on at least a part of one of said surfaces, wherein the layer comprises a varnish layer exhibiting a visually identifiable pattern.

In one embodiment, the visually identifiable pattern comprises a diffractive pattern. Such a pattern typically comprises a plurality of mechanical deformations, which upon reflection of incident waves of light, in particular light having a wave length within the range of visible light, will produce a diffractive pattern. Such a pattern may produce a varying visual effect depending on the observation angle relative to the light sources present. The pattern is formed of engravings, i.e., pits which extend from the surface of the varnish into the varnish layer, and/or rises which extend from the surface of the varnish layer away from the surrounding surface level. The pits and rises can also be of variable depth, breadth and height, respectively. In one embodiment, the diffractive pattern comprises a holographically imaged pattern (a hologram), which gives a three dimensional impression to the viewer.

In another embodiment, the visually identifiable pattern comprises a smooth gloss-enhanced area. This can be achieved by using a smooth or partly smooth embossing plate. It was surprisingly found, that the gloss of ordinary varnishes used, for example, in product packages, can be enhanced by subjecting the layer of varnish to pressure by an embossing plate, whose surface is flat and smooth. Thus, by the present method the gloss of varnished surfaces can be enhanced locally by means of pressing them with a planar plate.

In one embodiment, the visually identifiable pattern comprises a diffractive pattern and a gloss-enhanced area. In this embodiment, the embossing plate has a smooth area in addition to the microfabricated area. Alternatively, two or more different embossing plates having smooth or microfabricated surfaces can be used.

The flat-bed embossing is done using embossing means, which comprise at least one embossing plate. The working surface of the plate can be, for example, of metal having a microfabricated negative of the desired embossing.

The substrate comprises a paper or paperboard sheet. The sheet may be of any form, for example, a rectangular sheet for writing or printing, a planar blank for a package, or even in the form of a folded or partly folded package. The sheet can also be of any size. Hence, the application areas of the invention extend from the marking of stamps to the marking of transport cases of large objects. The substrate may also comprise a special item, such as a cover page of a case of a compact disc. Being easy to manufacture and difficult to counterfeit, especially when mass product articles are concerned, the novel marking disclosed in this document provides an efficient protection against piracy, or at least makes proving of illegalities easier.

The sheet can also comprise a multi-layered structure of papers, paperboards, coatings, imprintings and varnishes, or any combination thereof. It can also contain macro-scale embossings, for example those common on chocolate and cosmetic packages. In addition, the sheet may be decorated with foils of any kind, e.g., aluminium or polymer, prior to varnishing. An example of a typical substrate is a coated paperboard having an imprinting and a varnish layer on at least part of the substrate sheet.

The above embodiments are illustrated in the attached drawings.

FIGS. 1-6 show some exemplary embodiments of embossed sheets in an arbitrary scale. Referring to the figures, the base layer 10, 20, 30, 40, 50 and 60 of the paper of paperboard can be made of chemical, chemi-mechanical or mechanical pulp, recycled fibers, or a mixture thereof. Typical paperboard products are, for example, cartonboards, such as folding boxboards, chipboards, solid bleached and unbleached boards and liquid packaging boards, and liners of containerboards. In addition, fine quality varnished papers used in covers of magazines and brochures, for example, form a potential group of substrates for the present method.

The grammage of the substrate can be within a broad range. Basically the method can be applied on thin papers, weighing 30-80 g/m$^2$, ordinary papers in the range of 80-120 g/m$^2$, high quality coated paper in the range of 120-300 g/m$^2$, and paperboards having typically a grammage of 120-500 g/m$^2$, or even more, in particular 200-300 g/m$^2$. In every product class, one can easily find a suitable application area. For example, paperboard substrates are suitable for outer coverings of packages, but the marking can as well be applied on the inner layers of a package, for example, on the interleaving papers of foodstuff packages such as chocolate-boxes. On these layers the marking mainly acts in its property of being decorative and visually attractive, thus giving additional value and uniqueness to the product.

The substrate is at least partly coated with a varnish 12, 22, 32, 42, 52 and 62. The varnish can be a long, medium, or short oil based varnish, water emulsion varnish or a synthetic varnish or a lacquer. Preferably the varnish is polymer-based. Suitable varnish materials are for example polystyrene, polypropylene, polyacrylate, polyamide, poly(vinyl butyral), poly(vinyl alcohol), poly(vinyl chloride), resins and cellulose ester. The varnish can also be a cellulose derivative, e.g., a cellulose ester, such as cellulose acetate or nitrocellulose, or a cellulose ether, such as methyl or benzyl cellulose. It can be mixed with modifying agents, such as plasticizers, resins and waxes. The varnish can be water or solvent dispersible and/or it can be dried or cured by using ultraviolet light. The cured or dried varnish can have a dull finish or it can have a moderate or high gloss. In addition to colorless varnishes, also substrates with tinted varnish layers can be subjected to the present method.

The varnish can be applied by on-line coating techniques in the manufacturing phase of the substrate or it can be applied by offset coating or screen-printing. On-line varnishing is particularly suitable for large non-printed substrates, while offset methods can be used for overprinting varnishes, for example, for packaging purposes.

The varnish can be applied on the whole area of the sheet, or, in the case of, for example, packages or envelopes, only discrete areas of the product are varnished. Thus some areas of the packages may be left without varnish. These areas include, for example, side-seams and joints, which may be subjected to a bonding agent, such as size or glue, for bonding the area to another part of the same sheet, to another sheet, or to another object. Varnishing is typically the last printing step in the package printing process. In addition, off-line varnishing machines can be used, for example, to achieve a thicker layer of varnish. The application methods of different types of varnishes and the side-seaming arrangements are well known in packaging industry.

The grammage of the varnish 12, 22, 32, 42, 52 and 62 on the varnished area can be, for example, 0.1-15 $g/m^2$, in particular 2-5 $g/m^2$, typically about 3.5 $g/m^2$. Visually good results have been achieved with embossings, whose depth is only about 0.2 μm (denoted with h in FIG. 1), in which case the sufficient amount of varnish layer is only about 0.1 $g/m^2$ for polystyrene varnishes. By using thicker varnish layers 12, 22, 32, 42, 52 and 62, the appearance of the marking can be affected, as it moves farther away from the surface of the base material, and potentially the imprinting. Naturally, one can also use embossing plates which contain more deeply engraved patterns.

Varnishes are typically used for protecting the paper of paperboard, in particular their surfaces, and to enhance their gloss. Particularly, varnishes are used for protecting the printing 14, 24, 34, 44, 54 and 64 on the paper or paperboard. In one embodiment of the invention, the substrate is imprinted prior to varnishing and embossing. The visual appearance of the diffractive pattern evokes is impressive and it seems to be located right on top of the substrate. On non-printed surfaces, it is possible to produce variable markings, whose appearance depends on the color of the substrate. In addition to transparent varnishes, opaque or partly opaque varnishes can be used as top-coating materials within the scope of the invention.

The paper or paperboard can be also multiple-coated. Additional coating layers 26, 36, 38, 46, 48, 56 and 66, which are known per se, can be applied on the front- or backside of the paper or board, and they may be applied before or after the printing.

Figure 1:
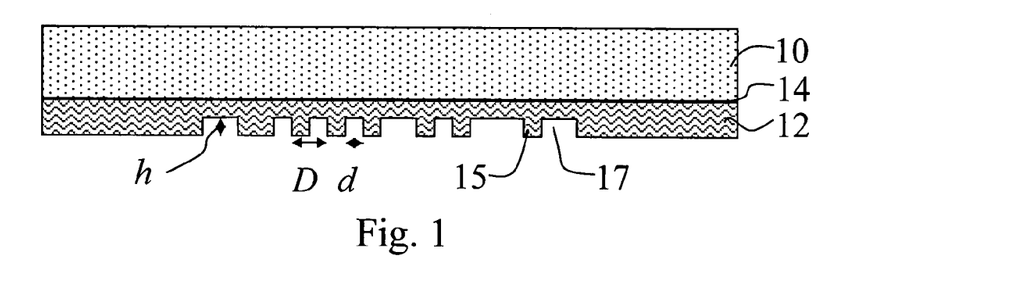
FIG. 1 shows the cross-section of a paper or paperboard having a base layer, imprinting and embossed varnish layer.
Figure 2:
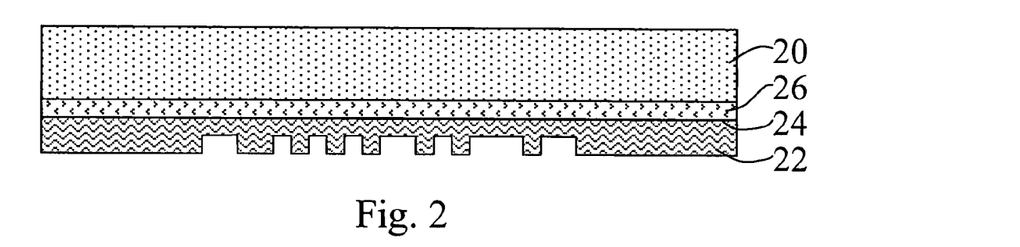
FIG. 2 shows the cross-section of a paper or paperboard having a base layer, coating layer, imprinting and embossed varnish layer.
Figure 3:
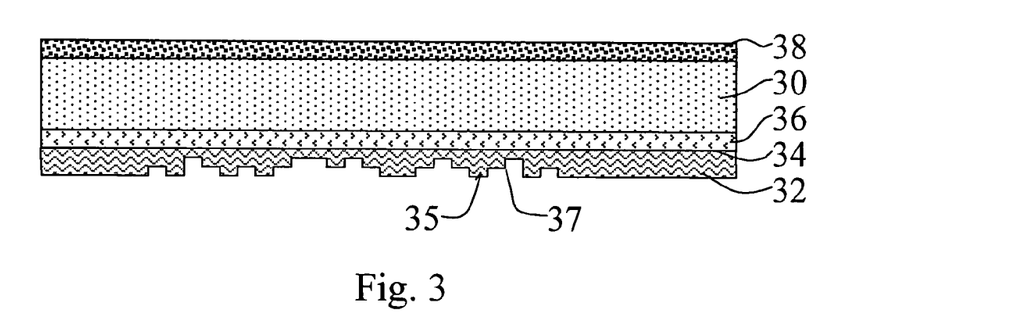
FIG. 3 shows the cross-section of a paper or paperboard having a back coating, base layer, top coating, imprinting and embossed varnish layer.
Figure 4:
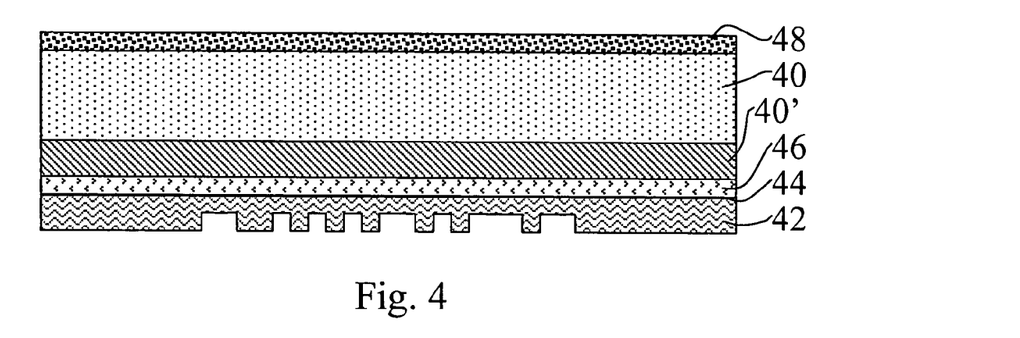
FIG. 4 shows the cross-section of a paper or paperboard having a back coating, first base layer, second base layer, coating layer, imprinting and embossed varnish layer.
Figure 5:
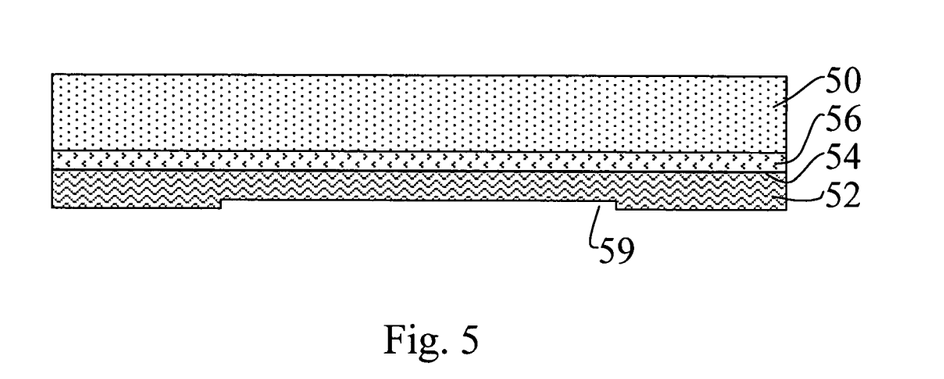
FIG. 5 shows the cross-section of a paper or paperboard having a base layer, coating layer, imprinting and embossed gloss-enhanced varnish layer.
Figure 6:
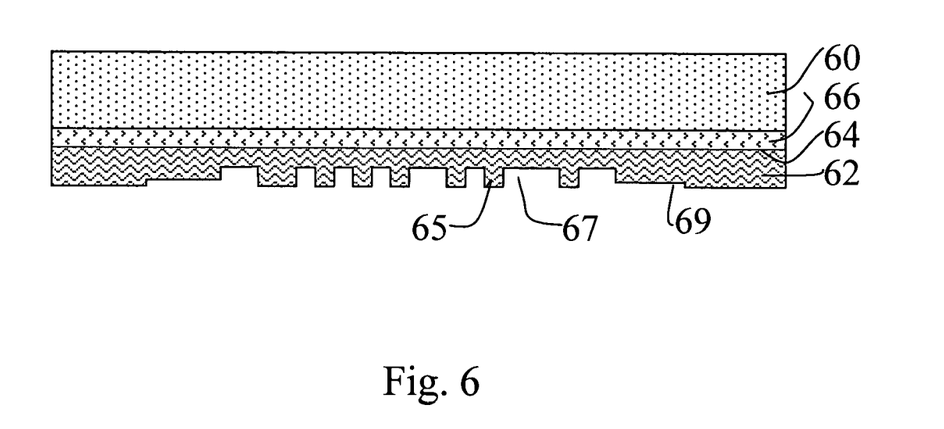
FIG. 6 shows the cross-section of a paper or paperboard having a base layer, coating layer, imprinting and embossed gloss-enhanced and diffractive varnish layer.
Figure 7:
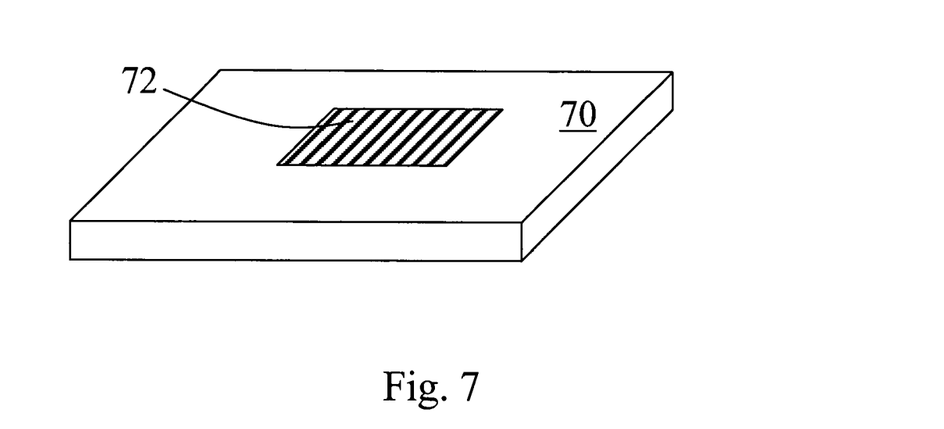
FIG. 7 shows in an axonometric view an embossing plate having smooth and microfabricated areas.
Figure 8:
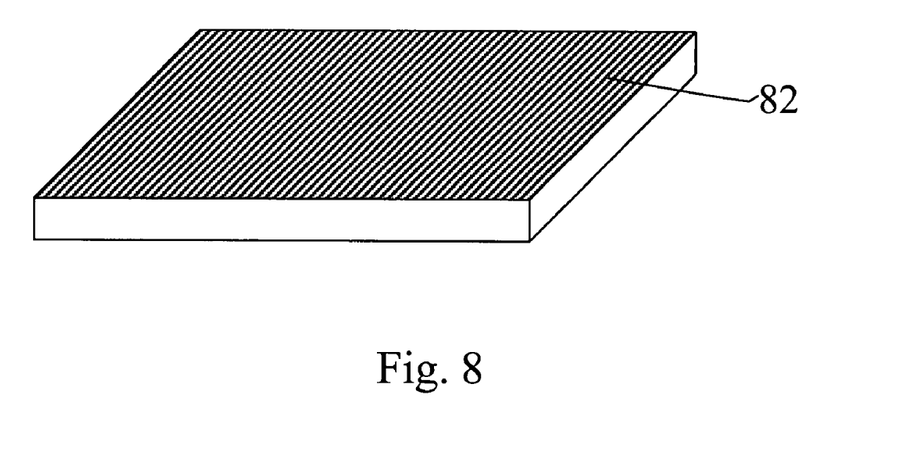
FIG. 8 shows in an axonometric view an embossing plate having only a microfabricated area.
Figure 9:
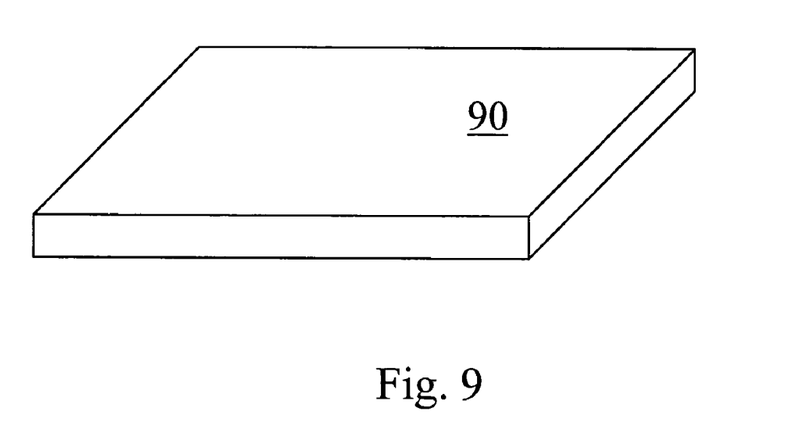
FIG. 9 shows in an axonometric view an embossing plate having a smooth area only.
Figure 10:
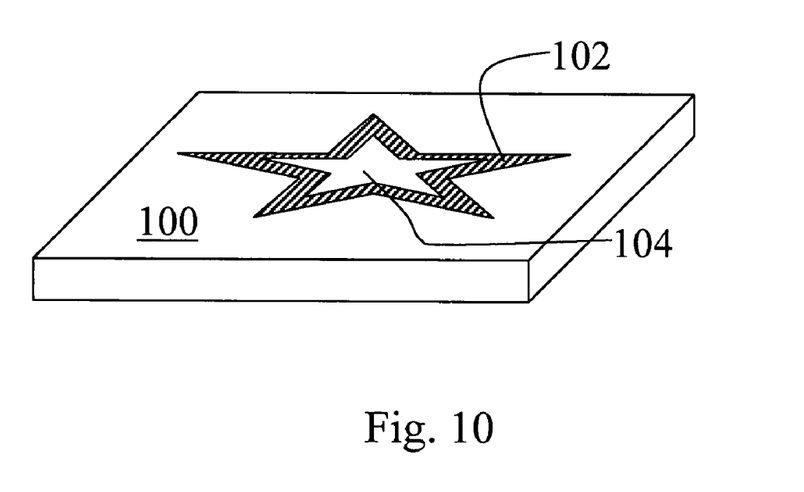
FIG. 10 shows in a axonometric view an embossing plate having nested smooth and microfabricated areas.
Figure 11:
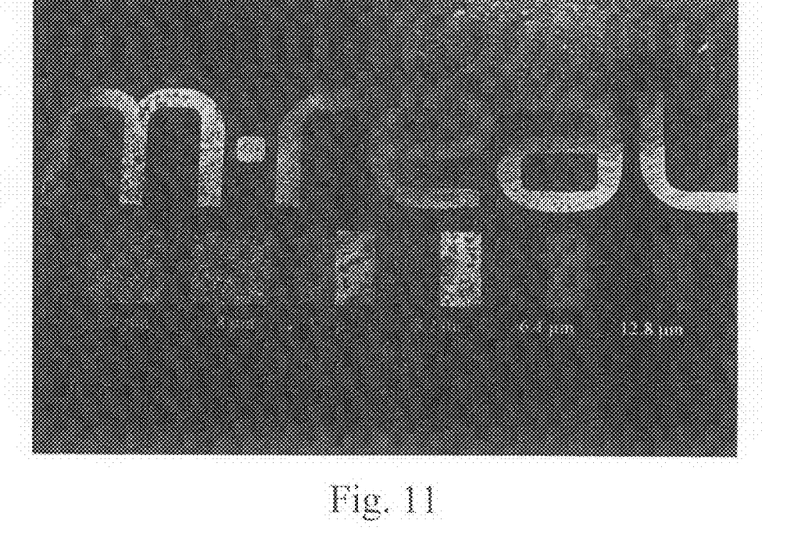
FIG. 11 shows a photograph of a diffractive embossing on a varnished paperboard sheet.

According to one embodiment, the embossing contains a diffractive pattern. An example of such embossing is shown in FIG. 11. The diffractive pattern comprises micro-scale structures formed mainly of grooves 17 and ridges 15, i.e., pits and rises, whose depth or height h, respectively, is, for example, 0.05-5 μm, typically 0.1-1 μm. When an exceptionally thick layer of varnish is used, the depth of the structure may be even more than 5 μm, however, typically less than 15 μm. Such an arrangement may be used in order to achieve a special kind of visual appearance. The pattern can also contain structures 35 and 37 of varying depth or height profiles, whereby visually more diverse embossings can be achieved. The patterns can be of any form. They can, for example, consist of figures or text formed by any combination of stripings, grids, dots, dot arrays, curves, rounds and segments of lines. The engravings need not be as sharp-edged as in the attached figures, but they can comprise also rounded or more irregular forms, for example, sinusoidal patterns or ragged forms, which produce a matte effect.

According to a further embodiment, the diffractive pattern forms a hologram.

According to one embodiment, the diffractive pattern contains totally different visual data depending on the viewing angle. As an example, the marking can comprise a logo of the manufacturer when viewed obliquely from left, manufacturers name when viewed obliquely from right and a logo of the product when viewed obliquely from below. The embossing can thus contain many visually identifiable levels of information, which can be independent from each other (c.f. traditional 3-D holograms, which contain information on the same object from different angles).

The wavelength of visible light is about 400-700 nm. Diffraction of light is an interference phenomenon observed, when light runs into an object having dimensions of comparable order of magnitude. Different wavelength components of the incoming wavefront interfere at different angles, which results in a rainbow-like impression, depending on the spectrum of light used and the observation angles. In holograms, this phenomenon is utilized to store three-dimensional visual information into a diffraction pattern. The fundamental law of diffraction from a grated surface is given by the Bragg's law:

$$2D \sin \theta = m\lambda, \quad (1)$$

where D is the separation of the slits in the grating,
θ is the angle between the propagating wavefront and the surface,
m is the spectral order, and
λ is the wavelength of light.

The separation D of the adjacent grooves 17, 37, 67 and ridges 15, 35, 65, i.e., the resolution of the embossing, is preferably roughly of the same order of magnitude as the wavelength of visible light. Because of the integer factor m in the Bragg's law, diffraction also takes place on surfaces with a separation larger than that. The lower limit for the separation D is, however, usually dictated by the physical properties of the varnish.

For example, a polystyrene based varnish was embossed with linear gratings which had periods D of 0.4, 0.8, 1.6, 2.4, 3.2, 6.4 and 12.8 μm (that is, the distances d between a groove and an adjacent ridge were 0.2, 0.4, 0.8, 1.6, 3.2 and 6.4 μm, respectively). An exemplary photograph of this experiment is shown in FIG. 11. It was found, that the gratings with periods 1.6, 2.4, 3.2 and 6.4 μm produced the clearest diffraction. The other gratings were also detectable as dull areas, but only a weak diffraction, or no actual diffraction was observed. The replication of finer gratings on polystyrene was obviously insufficient. Hence, the practical diffractive area in the case of polystyrene is approximately 1-10 µm, at least about 1.6-6.4 µm, expressed in the sense of the period D of the structure. According to the Bragg's law (Equation 1), by controlling the period of the grating, one can control the period of the color spectrum diffracted from the grating (i.e., at which angles a certain color interferes constructively). However, also structures with a resolution outside the actual diffractive range or visible light can be used to bring diversity to the embossings. Although this review concentrates mainly on regular linear gratings, the principles given here apply for all kinds of microscale structures, such as holograms. In addition, the distance ranges given above can be considered useful for embossings on also other than polystyrene-based varnishes.

According to one embodiment, the separation of the grooves in the diffractive pattern is over 0.1 µm, for example, 0.5-15 µm, in particular 0.5-8 µm, typically about 0.5-5 µm.

FIGS. 7-10 show four different examples of the embossing plates within the scope of the invention. According to one embodiment (cf. FIGS. 5 and 9), the surface 90 of the shim, and thus the embossing 59, is thoroughly smooth. The purpose of the smooth area is to enhance the gloss of the varnish 52 on some areas of the sheet. The gloss-enhancing property of the smooth area was an unexpected result of embossing experiments carried out by the applicant. In this context, the term "smooth area" refers to an area, which has not been engraved on purpose. The smooth area can be smoothened by polishing, grinding or coating, for example. The smooth area can also be side product of an electrolytic shim production process. The roughness of the smooth area is preferably less than the initial roughness of the surface of the varnish, typically 1-10 µm (PPS-10) according ISO 8791-4 standard.

In some embodiments (cf. FIGS. 6, 7 and 10), the embossing plate contains both a microengraved area 72, 102 and a smooth 70, 100, 104 area, which has not been microfabricated. By "microengraved" and "microfabricated" we mean areas which have been provided with mechanical deformations which have a minimum dimension in the range of about 0.1 to 10 micrometer.

Figure 12:
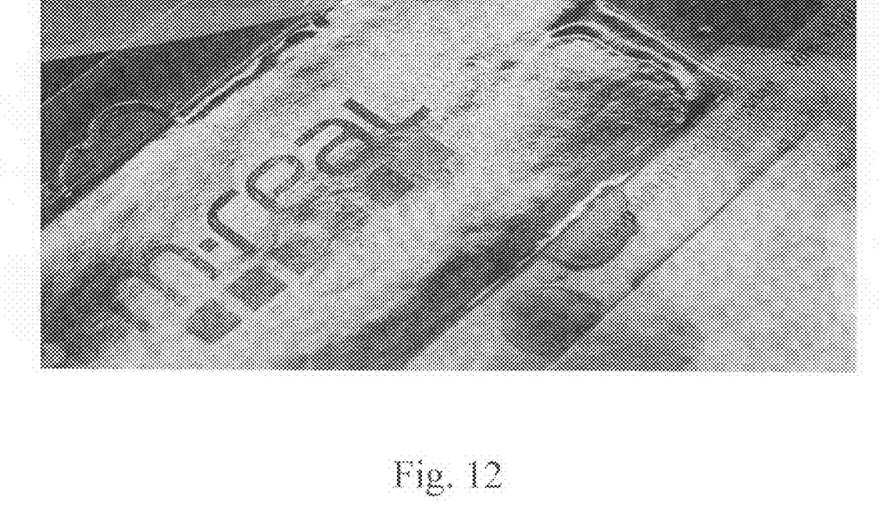
FIG. 12 shows a photograph of a diffractive embossing and a surrounding gloss-enhanced area on a varnished paperboard sheet.

The gloss of the varnished surface 62 can be enhanced in the vicinity 69 of the diffractive pattern 65, 67 to highlight the pattern in a fascinating way. A photograph illustrating this kind of embossing is shown in FIG. 12, where a diffractive embossing is surrounded by a rectangular gloss-enhanced area. The dints on the borders of the gloss-enhanced area are due to a large embossing pressure used in the experiment. However, comparable gloss-enhancement is achieved also by using lower embossing pressures. The area of the gloss-enhanced zone surrounding the microfabricated pattern can be for example at least 10%, and up to 1000% larger than the area of the microfabricated zone alone.

The improved gloss can be taken advantage of in many ways. First, it makes the marking very unique in contrast to known diffractive markings. Second, it serves as a security feature because it makes the product even more difficult to counterfeit. Third, it brings new possibilities for the designers of the markings to make the products visually more attractive. Fourth, the feeling of the gloss-enhanced area on the fingertips is different than that of the areas with no embossing at all.

Figure 13:
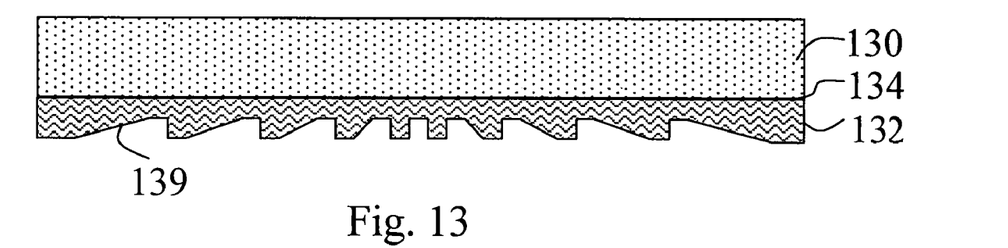
FIG. 13 shows the cross-section of a paper or paperboard having a base layer, imprinting and embossed varnish layer with beveled surfaces.

Referring to FIG. 13, according to one embodiment, the embossing shim, and thus varnish layer embossed with it, contains oblique faces, i.e., bevellings 139. That is, instead or in addition to the engravings and smooth area(s) described above, the visually detectable pattern can be locally beveled. The angle of the bevellings 139 with respect to the plane of the shim (or the surface of the varnish layer) can be, for example, 0-90°, in particular 20-70°. The dimensions of the bevellings 139 can be in the diffractive range or they can be essentially larger than the dimensions of the diffractive patterns. Hence, the bevellings 139 can be used to reflect light diffractively or non-diffractively, although diffraction may always be present in minor degree. The bevellings 139 can be used, for example, to outline a diffractive pattern or to produce a viewing-angle-dependent visual impression. Combined with diffractive and/or gloss-enhanced areas, the beveled areas can be used to produce another kind of unique security feature or decoration.

In the following, the method of producing a visually identifiable pattern described above is disclosed in more detail.

FIGS. 7-10 show examples of embossing shims, i.e., embossing plates, suitable for the present method. The plate or at least its working surface is preferably formed of metal. The plate is preferably such that a negative of the potential diffraction pattern can be microfabricated on it by a method known per se. Such methods include, for example, mechanical engraving, laser engraving, lithographic methods and chemical etching. The pattern can be of a protruding or engraved type, or a mixture of these types, depending on which kind of embossing is preferred. The embossing plate can be attached to embossing means, which include the necessary devices and automation to carry out the embossing.

According to one embodiment, the embossing shim or at least the working surface of the shim is made of nickel. The manufacture of nickel plates is facile, and nickel plates are also readily microfabricated and they provide high surface smoothness. The plates can be manufactured by mechanical processing methods, but in order to produce high-smoothness surfaces, the surface layers of the embossing plates can be produced by physical or chemical deposition methods from suitable nickel precursors on a suitable substrate. Examples of such methods include PVP, CVD and ALD and plasma enhanced embodiments of these methods. Other optional plate materials include, for example, aluminum, silver, iron, copper, and brass.

The embossing shim can also comprise a thick supporting layer, for example, of steel, and a thinner working surface layer made of nickel or some other suitable metal. The surface layer is attached to the supporting layer by suitable releasable mounting means or by adhesives. The lands and grooves of the working surface are preferably pre-fabricated on the metal layer. Optionally, the working layer of the shim can comprise a ceramic, composite or plastic layer having significantly higher hardness than the hardness of the varnish used. In addition, the embossing plate can be also diamond-coated.

To replicate a negative of the pattern on the embossing plate on the substrate, the plate has to be contacted with the varnished surface of the substrate. A suitable contacting pressure, i.e., embossing pressure, is, for example, 1-10,000 MPa, in particular 5-3,000 MPa, typically 5-500 MPa. The optimal pressure depends on the type of paper or paperboard used, i.e., its fibre material and structure, fillers, thickness and compaction properties. The optimal pressure depends also on the type of varnish used, i.e., its material, initial gloss, surface roughness, hardness, surface tension and energy, and elastic properties, for example. In addition, the pressure depends on the material and finish of the embossing plate, and the size and resolution of the engravings on it. By adjusting the embossing pressure, the detaching of the embossing plate from the substrate can also be assisted.

By varying the temperature of the embossing plate, one can also affect the quality of the replicated pattern and the embossing process. Relevant factors in selecting the temperature are mainly the above-mentioned properties of the varnish and of the embossing plate. The surface temperature of the plate can be 0-150° C., typically 50-150° C., in particular 50-85° C. Although the process can be carried out also without heating, that is, in a room temperature of 15-25° C., it was found that at least in the case of polystyrene-based varnishes, the embossing quality and the detaching of the plate and the substrate was at its best at an elevated plate temperature of 65-75° C. It is also anticipated that different varnishes behave differently with respect to the plate temperature. Namely, other experiments show that, in particular, when very high-resolution embossing shims and some conventional varnishes are used, temperatures exceeding 85° C., preferably 100° C., and ranging up to the temperature of 150° C., and even up to 200° C., provide the best results.

The contacting time of the embossing plate and the varnish has also an effect on the embossing. The contacting time can vary from a few milliseconds to seconds, typically being in the range of 5-100 ms.

In one embodiment, the embossing is carried out against a rigid and hard surface. By this action, the breaking of the sheet can be secured. However, in some applications, it may be necessary to emboss against a suitably flexible bed.

According to one embodiment, the embossing plate and the embossed sheet are separated by pneumatic means. The separation can be done, for example, by directing a stream of air, or any other gas, between the plate and the sheet such that the pneumatic impact detaches them. Preferably the stream is directed against the sheet near the embossing plate to prevent the bending of the sheet. There may also be many streams on different sides of the sheet. In addition to detaching impact of the pneumatic separation, it can also have a cooling effect. This applies to the cases, where the embossing plate has been heated, and the heat has been transferred into the varnish during embossing. During the short pulse of air, the embossed pattern can cool down 10-20° C., for example, depending on the temperature and thickness of the varnish layer, equipment and the temperature and magnitude of the pulse. Hence, the varnish is hardened and the fading of the embossing due to elevated temperature is reduced. The pneumatic means can be part of the embossing means or they may form a separate pneumatic unit. The embossing means and the pneumatic means are preferably controlled by a single control unit. Separation means can also comprise equipment, which utilize pneumatic separation in combination with mechanical separation, or a mere mechanical separation may be utilized.

In one embodiment, the embossing means and the separation means are combined with die cutting means. The die cutting means comprise necessary equipment for cutting the sheet into a suitable form for folding, for example. Such machines are an essential part of typical package converting lines. Typically the printed and varnished packaging sheets are subjected to die cutting, whereby this particular processing phase is also suitable for producing the diffractive embossing. Besides cutting the sheet in the form of a blank, e.g., a folding box, die cutters are also used to make the folding lines (creases) on the blank. A typical flat bed die cutter comprises a large plate where a set of rules has been fastened. Cutting rules are sharp and the creasing rules are rounded. In the cutting phase, the large plate is pressed against the sheet in horizontal plane. In this kind of die cutter, the embossing plate can also be fastened to the large plate. The proportions of the forces the cutting rules, creasing rules and the embossing plate direct to the substrate, can be controlled by the relative elevations of the rules and the plate. This way, the number of processing steps would not increase. Many existing die cutting machines are convertible to combined die cutting and embossing devices, so that the costs could be kept very low. The throughput of the production scale embossing machinery can be, for example, 500-10000 sheets per minute.

According to one embodiment, the embossing is carried out by using a stamping machine of flat-bed type, perhaps a hot-foil stamping machine. However, no foils are needed in order to produce the embossing. Hence, the machine can be modified to better match the needs of embossing varnished substrates. However, many other machines capable of producing the required embossing force can be used in embossing.

EXAMPLE

A dispersion of polystyrene based varnish W1639 from DS Nordic was evenly applied on a coated paperboard—Simcote (255 g/m$^2$) and Nova X (345 g/m$^2$) as a single layer in the end of sheet-fed off-set printing machine. The dry coat weight was ca. 3.5 g/m$^2$. At this point the printed and varnished paperboard had a clear and glossy appearance.

Thereafter, the layer of varnish on top of the paperboard was horizontally microfabricated by using a flat-bed hot foil stamping machine—*BOBST, type: Autoplatine SP* 1260-*BM, J. Bobst & Fils S. A.*, Lausanne, Switzerland, 1978. The embossing plate was first combined with a ca. 7.0 mm thick magnesium base plate utilizing a piece of precisely cut two-sided tape. The stack of plates was then attached in the machine frame employing special claw hooks.

The embossing plate contained letters that were formed by using linear gratings with periods; 0.80, 1.60, 2.40, 3.20, 6.40 and 12.8 μm. The profile height in all cases was 0.19+0.01 μm.

The running speed was varied between 1000 to 2600 sheets/h, the machine temperature in the range of 1.8 to 75° C. and the pressing force 0.01-5 MN. The embossing plate was in a direct contact with the layer of varnish on top of the paperboard during the process. A pneumatic separator was utilized in the process to avoid varnish sticking with the embossing plate by cooling the surface of the paperboard and generating ejecting force.

The outcome, in the whole range of tested variables, was comprised of visually detectable letters on the varnish layer of the paperboard surface. Visually these letters appeared to be above the off-set printed images on paperboard and they reflected the different wavelengths of light (colors) depending the angle of visual examination and the periods of linear gratings. In addition, the non-grated, i.e., non-microfabricated, plain part of embossing plate framed glossy spot effect on the varnished surface. Example photographs of the experiment are shown in FIGS. 11 and 12.

The invention claimed is:

1. A paper or paperboard sheet comprising in combination: an imprinted base layer having two opposite surfaces, and at least one layer of material arranged on at least a part of one of said surfaces, the layer of material comprising a varnish layer having grammage of 0.1-15 g/m$^2$ and exhibiting a visually identifiable pattern comprising a diffractive pattern, characterized in that the visually identifiable pattern comprises, in addition to the diffractive pattern, a gloss-enhanced area, the gloss-enhanced area comprising a local enhancement of the gloss of the varnish layer in the vicinity of the diffractive pattern.

2. A paper or paperboard sheet according to claim 1, characterized in that said varnish is polymer-based.

3. A paper or paperboard sheet according to claim 1, characterized in that said varnish is selected from the group of: polystyrene, polypropylene, polyacrylate, polyamide, poly (vinyl butyral), poly(vinyl alcohol), poly(vinyl chloride), cellulose ester, cellulose acetate, nitrocellulose, cellulose ether, such as methyl or benzyl cellulose.

4. A paper or paperboard sheet according to claim 1, characterized in that the base layer comprises at least one coating layer.

5. A paper or paperboard sheet according to claim 1, characterized in that the sheet is a packaging blank.

6. A paper or paperboard sheet according to claim 1, characterized in that the diffractive pattern comprises a hologram.

7. A paper or paperboard sheet according to claim 1, characterized in that the diffractive pattern comprises grooves having a separation of 0.1-15 μm.

8. A paper of paperboard sheet according to claim 1, characterized in that the diffractive pattern comprises grooves of depth 0.05-5 μm.

9. A paper of paperboard sheet according to claim 1, characterized in that the visually identifiable pattern comprises an embossing.

10. A paper or paperboard sheet according to claim 1, characterized in that the diffractive pattern comprises grooves having a separation of 0.1-8 μm.

11. A paper or paperboard sheet according to claim 1, characterized in that the diffractive pattern comprises grooves having a separation of 0.1-5 μm.

12. A paper of paperboard sheet according to claim 1, characterized in that the diffractive pattern comprises grooves of depth 0.1-1μm.

13. A paper of paperboard sheet according to claim 1, characterized in that the grammage of the varnish layer is 2-5 g/m$^2$.

* * * * *